United States Patent [19]

German

[11] Patent Number: 5,191,258
[45] Date of Patent: Mar. 2, 1993

[54] ELECTRIC CURRENT GENERATOR INCLUDING TORQUE REDUCING COUNTERMAGNETIC FIELD

[76] Inventor: James W. German, Rte. 2, Box 2091A, Shepherd, Tex. 77371

[21] Appl. No.: 757,548

[22] Filed: Sep. 11, 1991

[51] Int. Cl.⁵ ............................................. H02K 1/12
[52] U.S. Cl. ..................................... 310/254; 310/46; 310/168; 322/49
[58] Field of Search ................... 310/254, 113, 102 R, 310/46, 90, 156, 192, 264, 67 A, 138, 166, 153, 168; 322/46, 49, 50, 51, 52, 47

[56] References Cited

U.S. PATENT DOCUMENTS

| | | | |
|---|---|---|---|
| 2,218,859 | 10/1940 | Schweitzer | 322/46 X |
| 3,261,998 | 7/1966 | Bosco, Jr. et al. | 310/268 X |
| 3,431,444 | 3/1969 | Wilson | 310/168 |
| 3,983,430 | 9/1976 | Howard | 310/168 X |
| 4,027,229 | 5/1977 | Frink | 322/50 |
| 4,237,391 | 12/1980 | Schur et al. | 322/49 X |
| 4,385,246 | 5/1983 | Schur et al. | 322/49 X |
| 5,030,867 | 7/1991 | Yamada et al. | 310/156 |

*Primary Examiner*—Steven L. Stephan
*Assistant Examiner*—E. H. To
*Attorney, Agent, or Firm*—Jackson & Walker

[57] ABSTRACT

An alternating electric current generator comprises an armature rotatably carried by a drive shaft and positioned between stabilized, non-moving magnetic elements. The armature has first and second magnetic field transmitting sections with a magnetized section sandwiched therebetween. As electric load is applied to the generator, a countermagnetic field is generated through the armature to increase speed of the drive shaft and thereby lessen torque required to rotate the drive shaft.

1 Claim, 3 Drawing Sheets

ELECTRIC CURRENT GENERATOR INCLUDING TORQUE REDUCING COUNTERMAGNETIC FIELD

BACKGROUND OF THE INVENTION

(1) FIELD OF THE INVENTION

The invention relates to an alternating electric current generator.

(2) BRIEF DESCRIPTION OF THE PRIOR ART

Electric alternating current generators are well known and embody a number of varying components. All such previous generators heretofore known to those skilled in the art require an increase of activating power as electric load is required of the generator. In other words, as the electric load on the generator is increased, correspondingly more power is required of the motor, whether it be electric, fossil fuel-generated, hydro-powered, or the like.

Whenever there is an induced electromotive force in a conductor it is always in such a direction that the current it would produce would oppose a change which causes the induced force. If the change is the motion of a conductor through a magnetic field, the induced current must be in such a direction as to produce a force opposing the motion. If the change causing the force is a change of flux threading a coil, the induced current must produce a flux in such a direction as to oppose the change. That is, if the change is an increase in flux, the flux due to the induced current must be opposite in direction to the increasing flux. If the change is a decrease in flux, the induced current must produce flux in the same direction as the decreasing flux. The present invention avoids such a situation by providing for a counter-magnetic field to, in turn, reduce originally applied torque. In this regard, the present invention addresses the deficiencies of the prior art, as described.

SUMMARY OF THE INVENTION

The present invention provides an alternating current generator. The generator preferably will include a motor, such as an electric power-supplied motor, a fossil-fuel activated motor, hydro-powered motor, or the like. The generator can be provided, of course, independent of the motor driving means, and can be adapted to secure and operate in association with any such motor. Preferably, the alternating electric current generator will include a housing and a motor juxta-positioned relative to the housing. A drive shaft is provided which is rotatably driven by the motor. An armature has first and second sides and is rotatably carried by the drive shaft. The armature comprises first and second magnetic field transmitting sections at each outboard end. A central nonmagnetic field transmitting section is provided intermediate the first and second metal sections. Spacing means are positioned between each of the first and second magnetic field transmitting sections and the central non-magnetic metal section. Magnetic means on the first side of the armature are secured relative to the housing and have a passageway therethrough for receipt of the drive shaft. Bearing means are positioned between the magnetic means and the drive shaft to permit rotation of the shaft without movement of the magnetic means. Field core means are provided on the second side of the armature and are fixedly secured relative to the armature. The field core means comprises first and second field core sections. A field coil is sandwiched between the first and second field cores sections, and positive and negative electric current conduit means extend from the field coil.

BRIEF DESCRIPTION OF THE DRAWINGS

FIG. 4($b$) is a view of the armature section taken along lines 4($b$)–4($b$) of FIG. 3.

FIG. 4($c$) is a view of the armature taken along lines 4($c$)–4($c$) of FIG. 4($b$).

DESCRIPTION OF THE PREFERRED EMBODIMENTS

Figure 3:
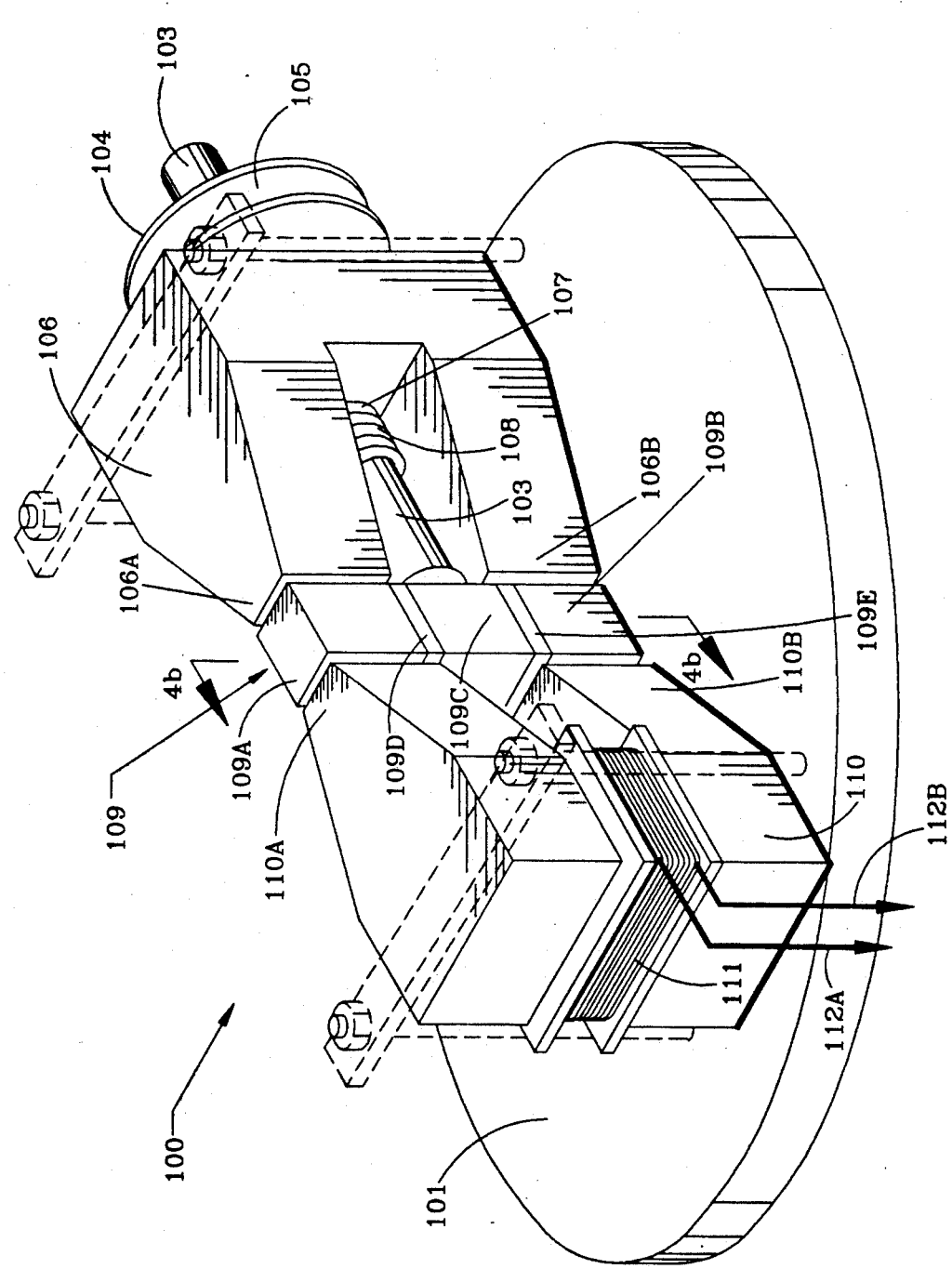
FIG. 3 is a perspective view of the generator of this invention.

With first reference to FIG. 3, the apparatus includes a housing 101 and a motor 102. The motor 102 may be an electrically actuated motor, a gas or diesel engine, a hydro-powered motor, or any other means well known to those skilled in the art for generating power defined as torque for purposes of rotating a drive shaft 103. Secured around the drive shaft 103 is a pulley 104 containing a beltway 105 for receipt of a belt (not shown) extending to the motor 102.

Outboard of the pulley 104 is defined a horseshoe-like permanent magnet 106 with horseshoe ends 106A, 106B. A passageway 107 is centrally defined through the permanent magnet 106 for insertion therethrough of the drive shaft 103. The magnet 106 is secured relative to the housing, and a bearing assembly 108 is provided between the interior of the magnet 106 and the exterior of the drive shaft 103 to permit the drive shaft 103 to rotate without transmitting such rotation to the permit magnet 106.

Figure 4A:
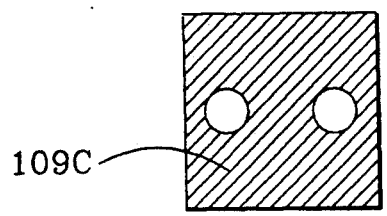
FIG. 4($a$) is an end view of section of the armature of the present invention.
Figure 4B:
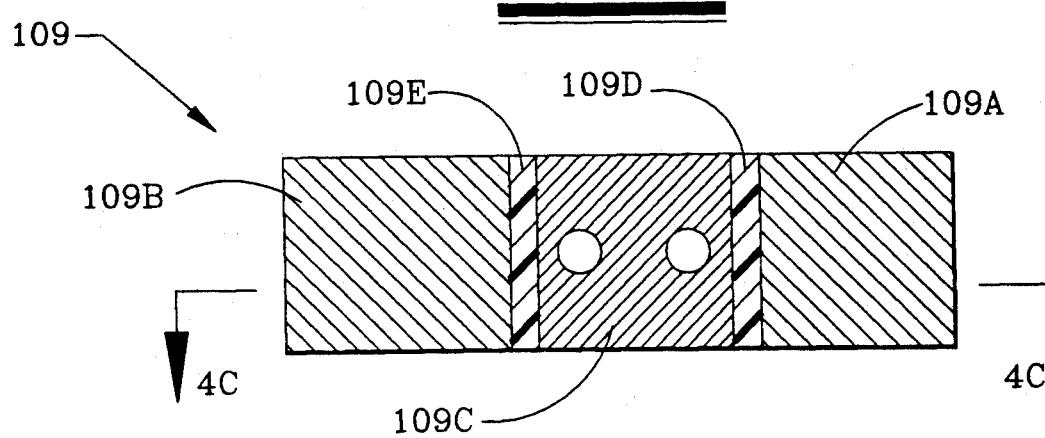
Figure 4C:
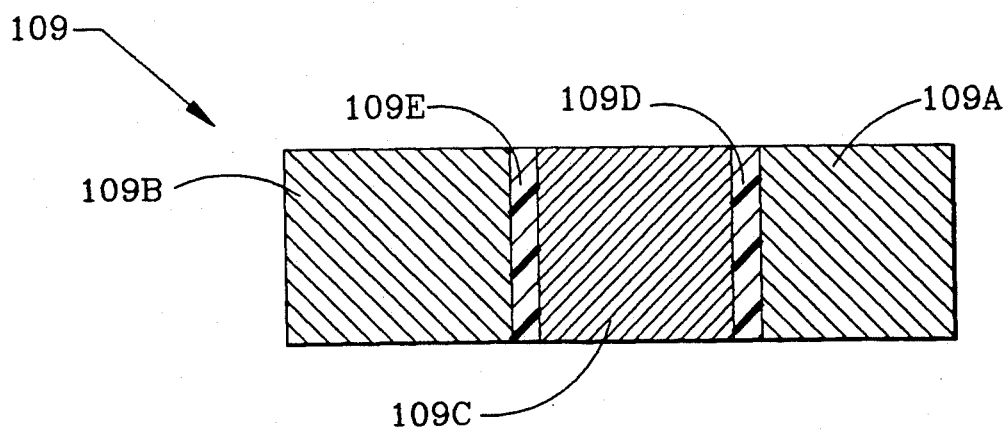

With reference to FIG. 4A, 4B and 4C, at the outboard-most end of the shaft 103 is secured an armature 109 having a first magnetic field transmitting section 109(A), of steel or the like and a companion second magnetic field transmitting section 109(B) of the opposite end thereof. As shown, the armature 109 is a rectangular bar. The second section 109(B) preferably will be made of the same material as the section 109(A), such as steel. A non-magnetic section 109(C) is sandwiched between the first and second sections 109(A), 109(B), and may be made of any non-magnetized metal, such as aluminum, brass or the like. Spacers 109(D) and 109(E) may be made of aluminum or brass and are used for fine adjustment of the total width of the armature 109. If no adjustment is needed, the spacers may be omitted.

Figure 1:
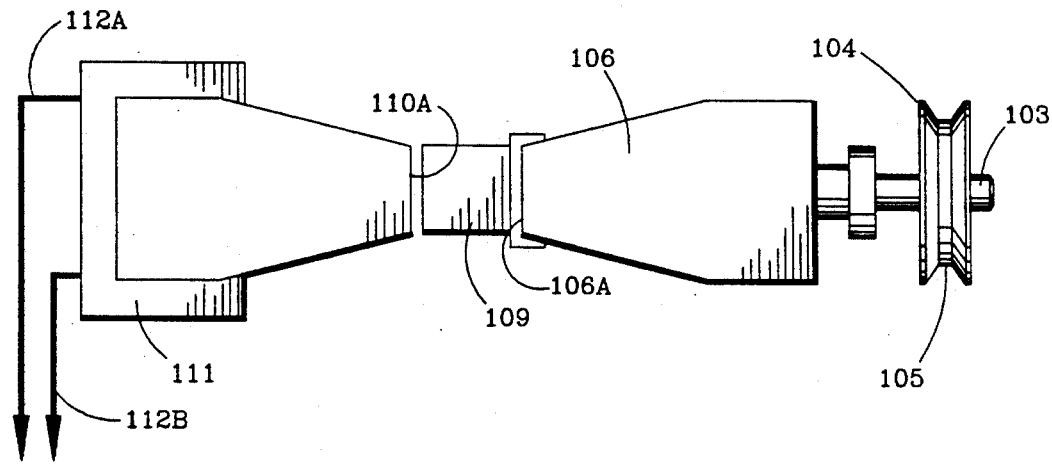
FIG. 1 is a plan view of the apparatus of the present invention from the top, looking downwardly.
Figure 2:
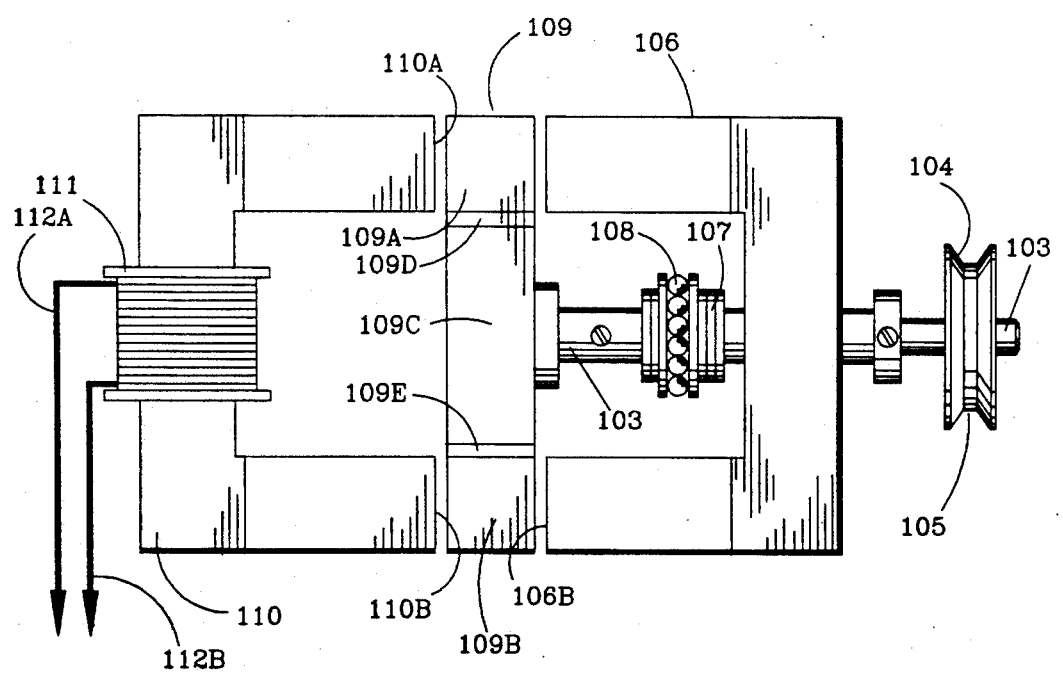
FIG. 2 is a view of the apparatus shown in FIG. 1 in side view.

Now with reference to FIGS. 1, 2 and 3, a field core 110 is secured within the housing 101 and has upper and lower ends 110(A), 110(B) facing toward and slightly spaced away from the armature 109. A field coil 111 is housed within the field core 110 with electric current positive and negative lines 112(A), 112(B) extending from the field coil 111 to, for example, an electric light, electric motor, or any other electric load requiring apparatus.

OPERATION

As shown, as an electric load is placed on the field coil 111, the torque required of the motor 102 to rotate the drive shaft 103 will decrease. Accordingly, the pulley 104 through the beltway 105 transmits torque activated by the motor 102 to the drive shaft 103 to rotate the shaft. Because of the positioning of the bearing assembly 108 relative to the drive shaft 103 and the permanent magnet 106, the drive shaft 103 will rotate the armature 109 while the permanent magnet 06 is stabilized. As the armature 109 rotates between the field coil 111 and the permanent magnet 106, a countermagnetic field is produced. Accordingly, as the armature 109 is rotated, magnetic induction occurs and the permanent magnet 106 will magnetize the field coil 111. As energy is withdrawn through the lines 112(A), 112(B), a countermagnetic field is generated within the field coil 111. This countermagnetic field is absorbed through the armature 109. Accordingly, magnetization is discharged through the apparatus as well as absorbed through the apparatus in equal proportions and in accordance with the quantity of the load directed from the field coil 111. Accordingly, as the load is increased on the field coil 111, the rotation of the drive shaft 103 will increase, thus reducing the amount of torque required to be transmitted through the pulley 104. Thus, the apparatus 100 controls the magnetic fields, both positive and negative, with respect to the field coil 111 causing magnetization and collapse of magnetic field. As the armature 109 rotates, magnetic conduction is transmitted to the field coil 111. Countermagnetic induction is absorbed through the armature 109(C) thereby creating the countermagnetic forces to reduce idle force in the drive shaft 103.

Although the invention has been described in terms of preferred embodiments, it should be understood that this is by and for purposes of illustration. Operating techniques and alternative embodiments will become obvious to those skilled in the art in view of the disclosure and claims herein.

What is claimed and desired to be secured by Letters Patent is:

1. An alternating electric current generator, comprising:
   (1) a housing;
   (2) a motor activated drive shaft rotated by application of torque;
   (3) a counter-magnetic field absorbing armature having first and second sides and rotatably carried by said drive shaft, said armature comprising; first and second field transmitting sections at each outboard end on said armature; a central nonmagnetic metal section intermediate said magnetic field transmitting sections; and spacing means positioned between each of said magnetic field transmitting sections and said central nonmagnetic section;
   (4) a magnet;
   (5) magnetic means on said first side of said armature secured relative to said housing and having a passageway therethrough for receipt of said drive shaft, said magnetic means providing a magnetic path between said magnet and a field coil;
   (6) bearing means between said magnetic means and said shaft to permit rotation of said shaft without movement of said magnetic means;
   (7) field core means on the second said of said armature and fixedly secured relative to said armature for inducing an electric current energizing said armature; said field core means comprising first and second field core sections; a field coil for generating a counter-magnetic field for absorption by the armature and sandwiched between said first and second field core sections; and
   (8) positive and negative electric current conduit means extending from said field core means for transmitting the generated current, whereby, as load is increased on the field coil, the rotation of the drive shaft will increase and the application of torque to said drive shaft may be decreased.

* * * * *